(12) United States Patent
Suzuki

(10) Patent No.: US 12,162,592 B2
(45) Date of Patent: Dec. 10, 2024

(54) AIRCRAFT WITH PIVOTALLY CONNECTED WING AND ROTOR

(71) Applicant: AERONEXT INC., Shibuya-ku (JP)

(72) Inventor: Yoichi Suzuki, Shibuya-ku (JP)

(73) Assignee: AERONEXT INC., Shibuya-ku (JP)

( * ) Notice: Subject to any disclaimer, the term of this patent is extended or adjusted under 35 U.S.C. 154(b) by 614 days.

(21) Appl. No.: 17/609,348

(22) PCT Filed: Sep. 17, 2019

(86) PCT No.: PCT/JP2019/036361
§ 371 (c)(1),
(2) Date: Nov. 5, 2021

(87) PCT Pub. No.: WO2020/059703
PCT Pub. Date: Mar. 26, 2020

(65) Prior Publication Data
US 2022/0315213 A1    Oct. 6, 2022

(30) Foreign Application Priority Data

Sep. 22, 2018   (WO) ................. PCT/JP2018/035234

(51) Int. Cl.
*B64C 3/48* (2006.01)
*B64C 3/38* (2006.01)
(Continued)

(52) U.S. Cl.
CPC .............. *B64C 27/28* (2013.01); *B64C 3/385* (2013.01); *B64C 3/48* (2013.01); *B64C 9/08* (2013.01);
(Continued)

(58) Field of Classification Search
CPC ....... B64C 3/385; B64C 3/48; B64C 29/0033; B64C 39/08
See application file for complete search history.

(56) References Cited

U.S. PATENT DOCUMENTS 10,054,939 B1 *  8/2018  Applewhite ......... G08G 5/0008
2009/0266942 A1  10/2009  Karem
(Continued)

FOREIGN PATENT DOCUMENTS

CN    1898128 A    1/2007
CN    106394895 A    2/2017
(Continued)

OTHER PUBLICATIONS

European Search Report and Written Opinion dated May 27, 2022 for European Patent Application No. 19863922.1.
(Continued)

*Primary Examiner* — Brady W Frazier
*Assistant Examiner* — Shanna Danielle Glover

(57) ABSTRACT

An aircraft that enables an efficient and safe transition from hovering to level-flight. The aircraft according to the present invention includes a lift generating part, a thrust generating part capable of flying and hovering, a connecting part that displaceably connects the lift generating part and the thrust generating part so that the lift generating part can maintain a positive angle of attack with respect to the flying direction at least at the time of ascending. The lift generating part is a wing part having a main surface, and at least at the time of hovering, a propulsion direction by the thrust generating part is along a direction obliquely intersecting the vertical direction. At least at the time of hovering, the propulsion direction and the main surface form an obtuse angle. At least at the time of hovering, the propulsion direction is along the vertical direction.

9 Claims, 16 Drawing Sheets

(51) Int. Cl.
- *B64C 9/08* (2006.01)
- *B64C 27/28* (2006.01)
- *B64C 29/00* (2006.01)
- *B64C 39/08* (2006.01)
- *B64U 10/25* (2023.01)
- *B64U 30/10* (2023.01)
- *B64U 50/13* (2023.01)

(52) U.S. Cl.
CPC .......... *B64C 29/0033* (2013.01); *B64C 39/08* (2013.01); *B64U 10/25* (2023.01); *B64U 30/10* (2023.01); *B64U 50/13* (2023.01)

(56) References Cited

U.S. PATENT DOCUMENTS

| | | |
|---|---|---|
| 2010/0193644 A1 | 8/2010 | Karem |
| 2011/0001001 A1 | 1/2011 | Bryant |
| 2015/0314867 A1 | 11/2015 | Razroev |
| 2018/0002011 A1 | 1/2018 | McCullough et al. |
| 2018/0237136 A1 | 8/2018 | Choi |
| 2021/0171191 A1* | 6/2021 | Castellano Aldave ................... B64C 29/0033 |

FOREIGN PATENT DOCUMENTS

| | | | |
|---|---|---|---|
| EP | 1224117 A1 | 7/2002 | |
| EP | 3263445 A1 | 1/2018 | |
| JP | 2006327219 A | 12/2006 | |
| JP | 2007508998 A | 4/2007 | |
| JP | 2015180564 A | 10/2015 | |
| JP | 2018020742 A | 2/2018 | |
| WO | 0130652 | 5/2001 | |
| WO | 2015089679 A1 | 6/2015 | |
| WO | WO-2016035068 A2 * | 3/2016 | ............ B64C 13/24 |
| WO | 2017158417 A1 | 9/2017 | |

OTHER PUBLICATIONS

Notice of Reasons for Refusal dated Aug. 29, 2019 for related JP Patent Application No. 2019-541467.
European Examination Report dated Oct. 12, 2023 for European Patent Application No. 19863922.1.
The First Office Action dated Oct. 28, 2023 for Chinese Patent Aplication No. 201980072008.X.
The Second Office Action dated Jun. 7, 2024 for Chinese Patent Application No. 201980072008.X.
Notice of Reasons for Refusal dated Aug. 8, 2024 for Japanese Patent Application No. 2023-218530.

* cited by examiner

[FIG. 1]
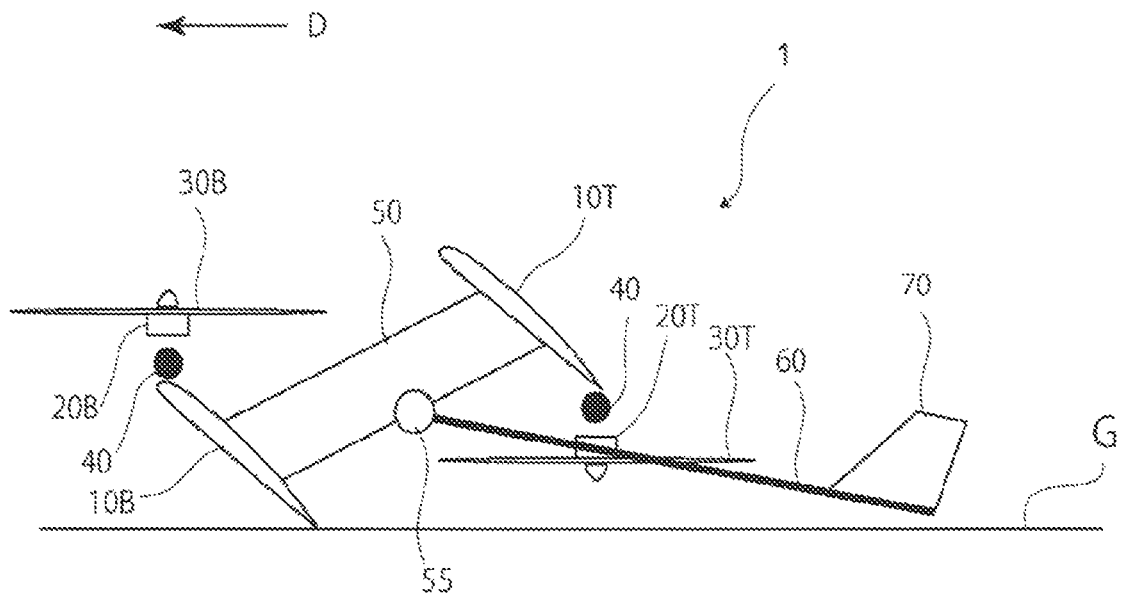
[FIG. 2]
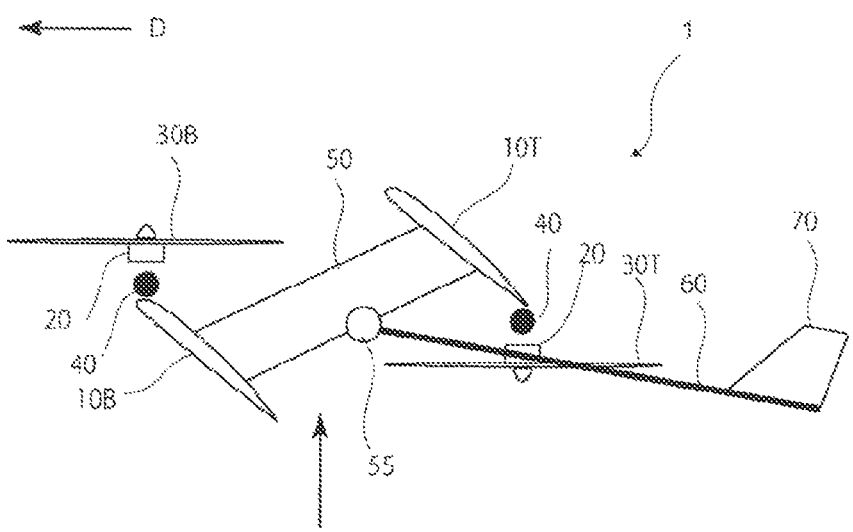

[FIG. 3]
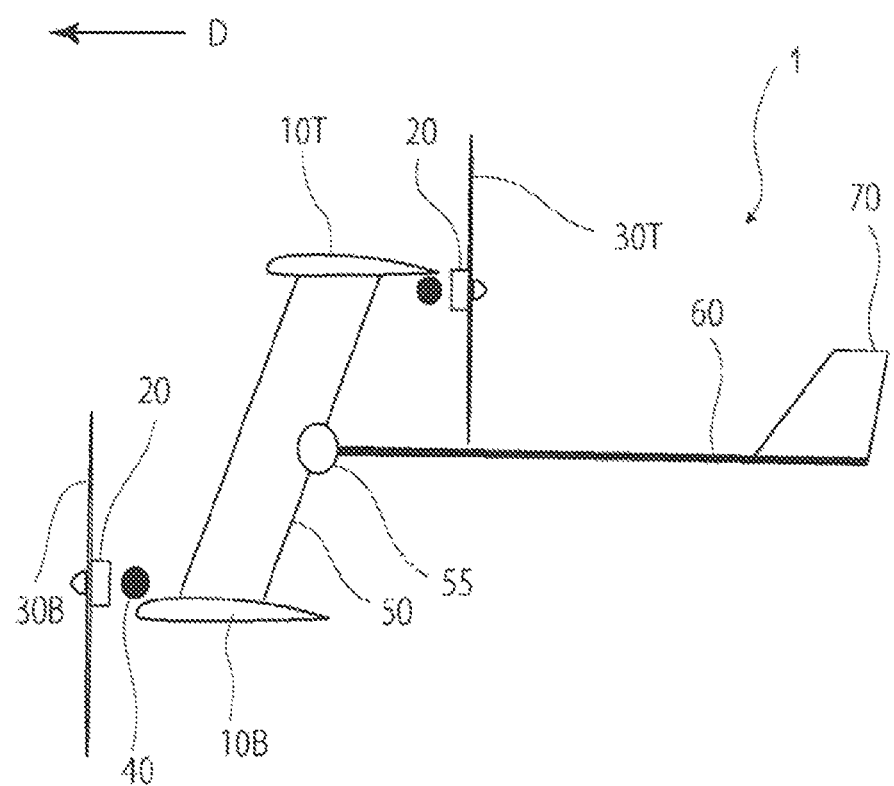

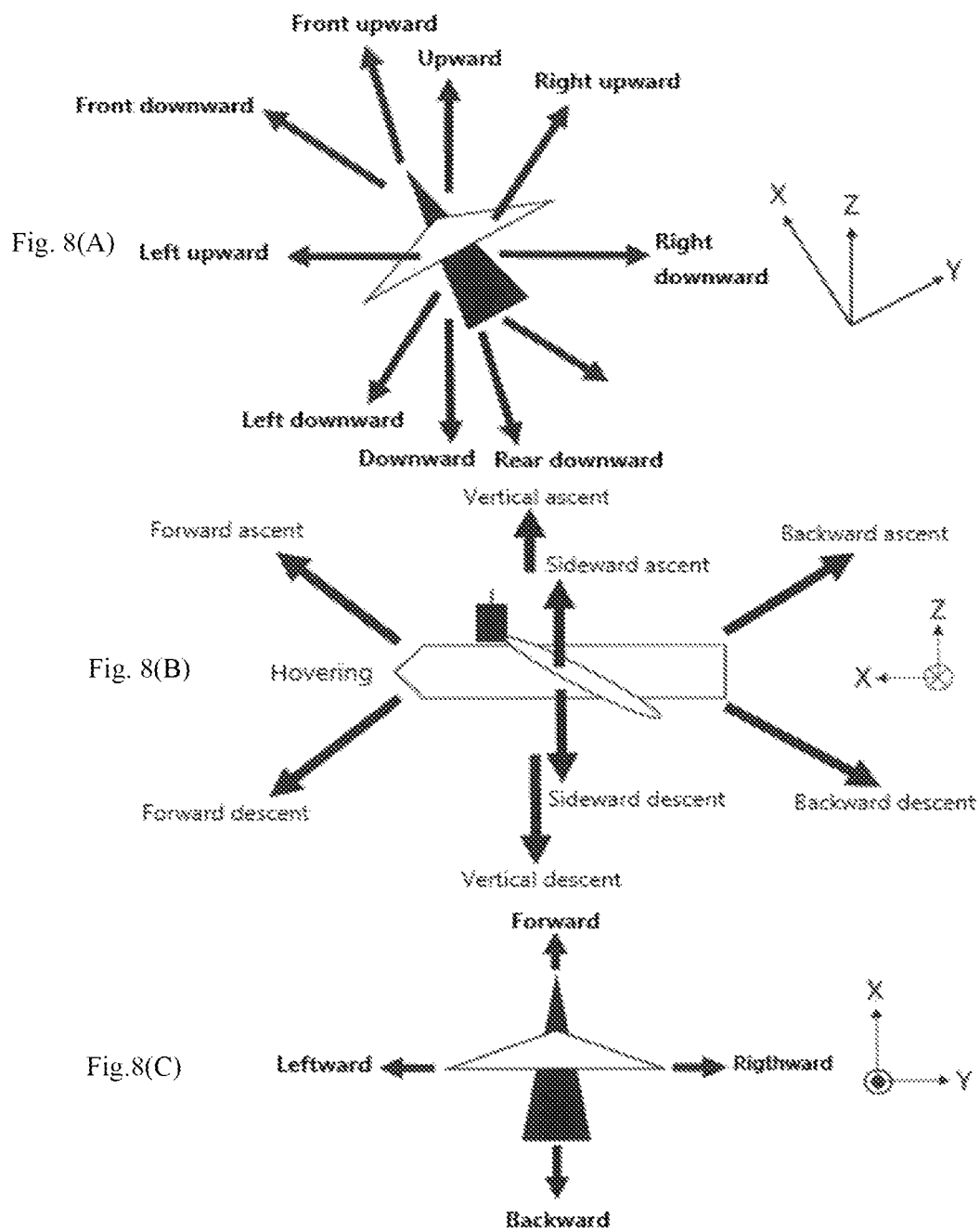

Θ>90 degree

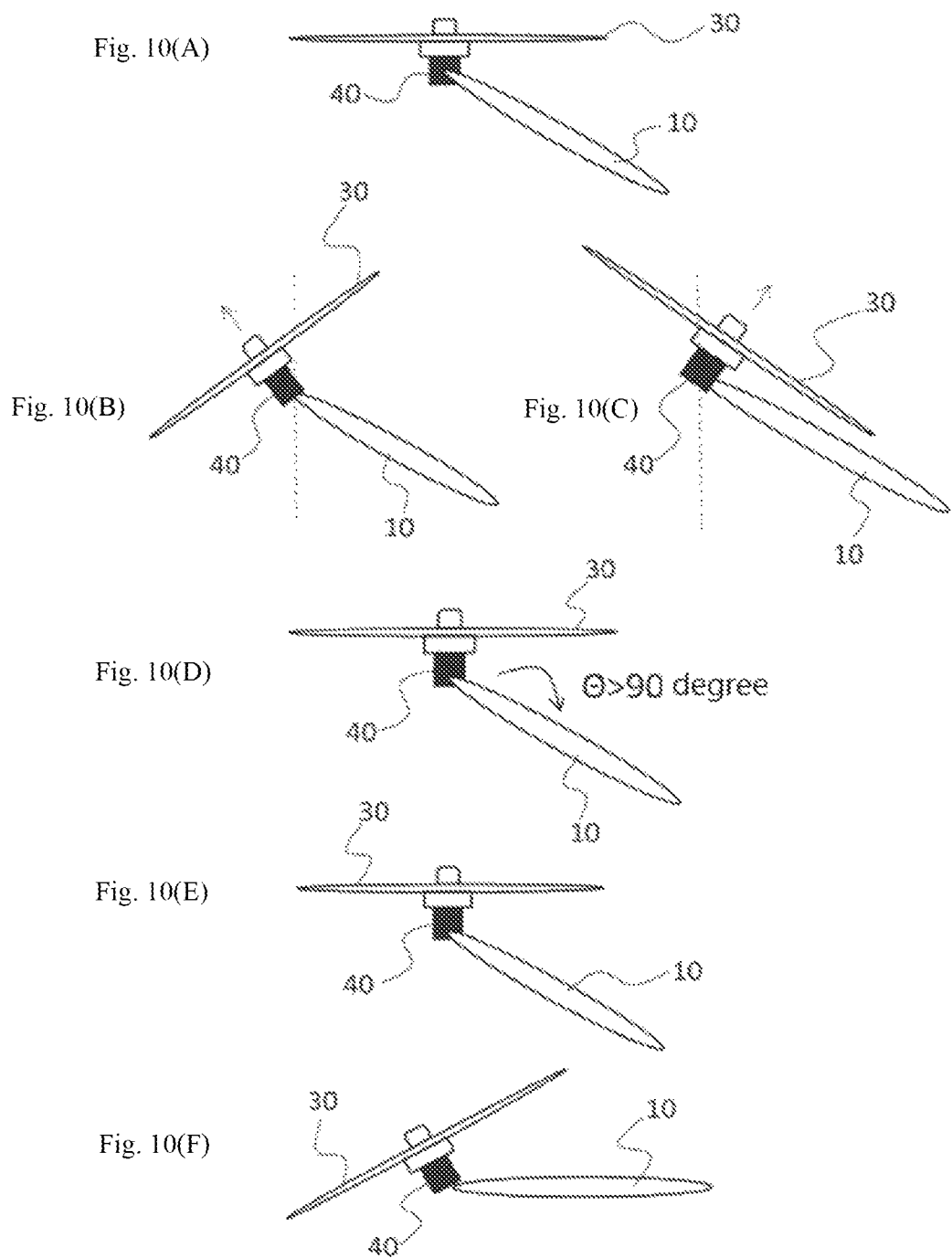

Θ>90 degree

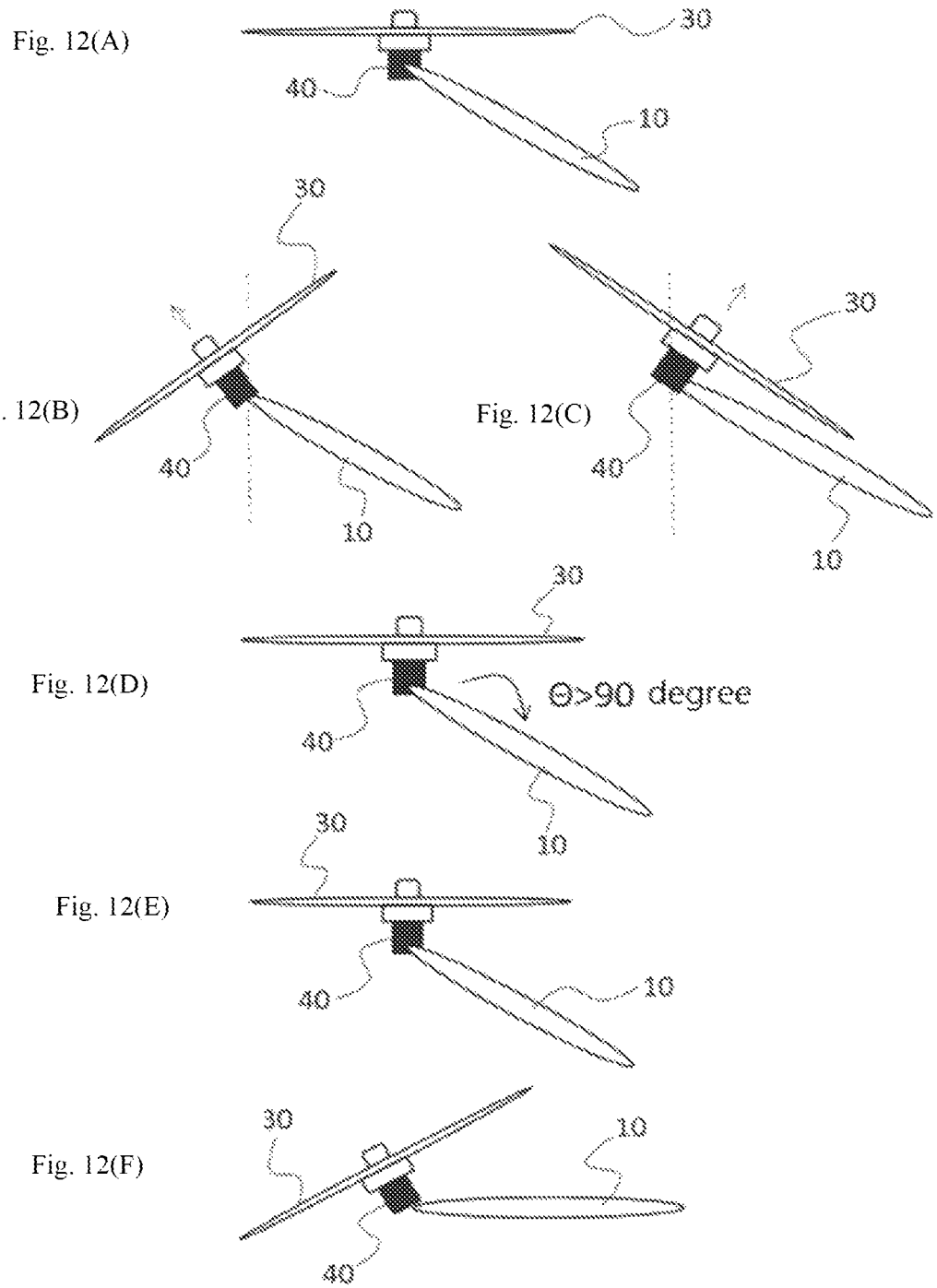

Θ>90 degree

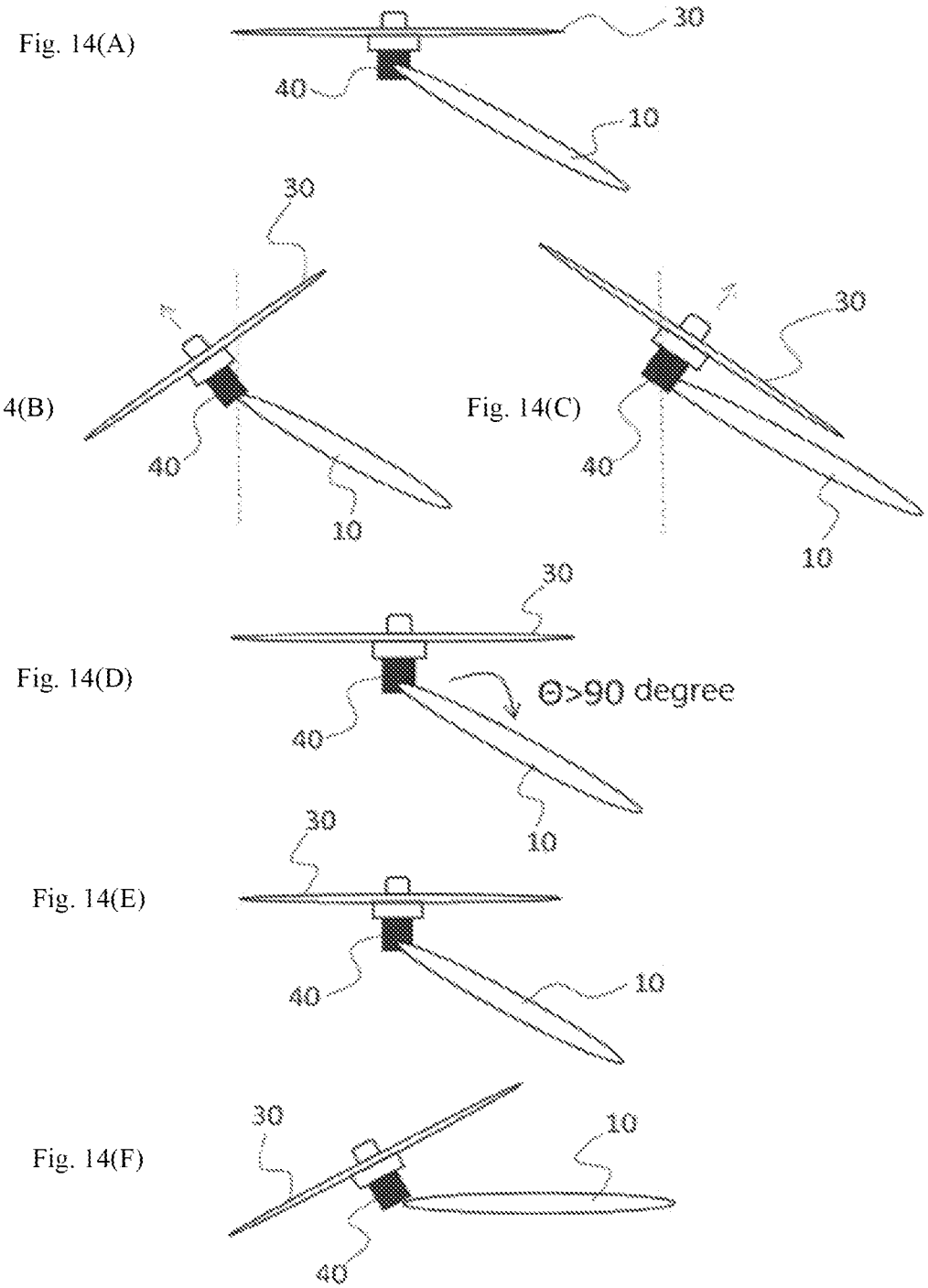

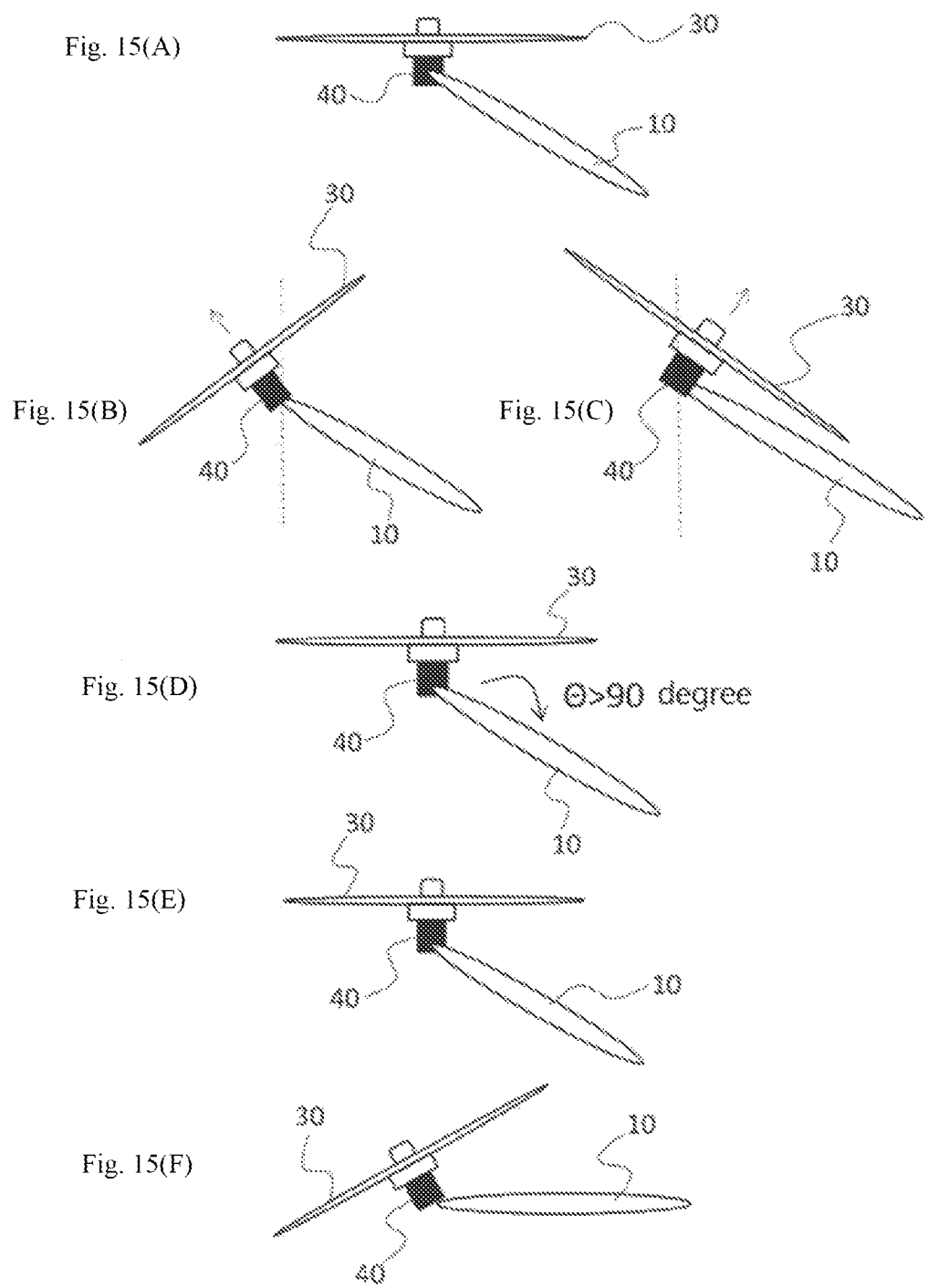

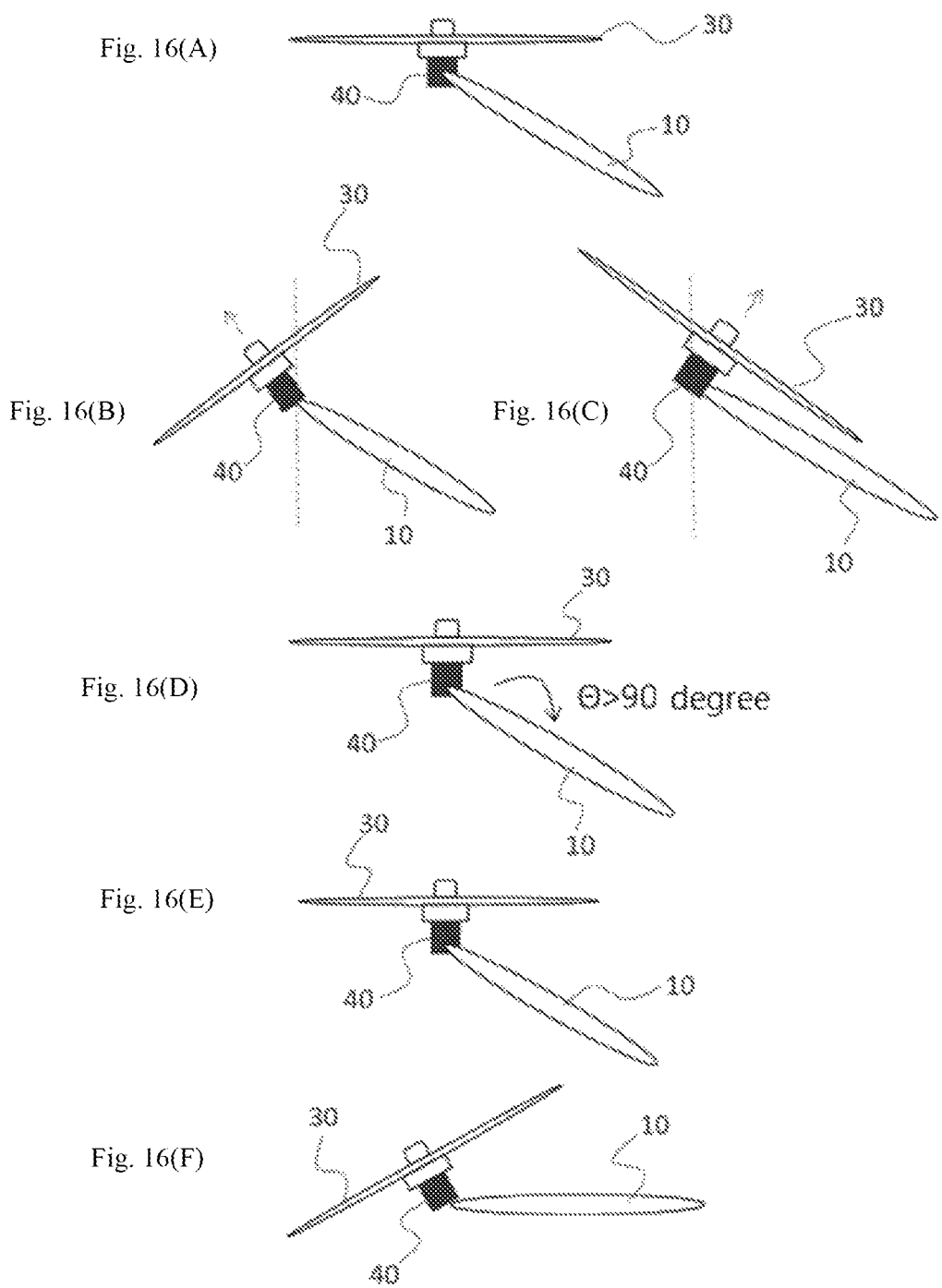

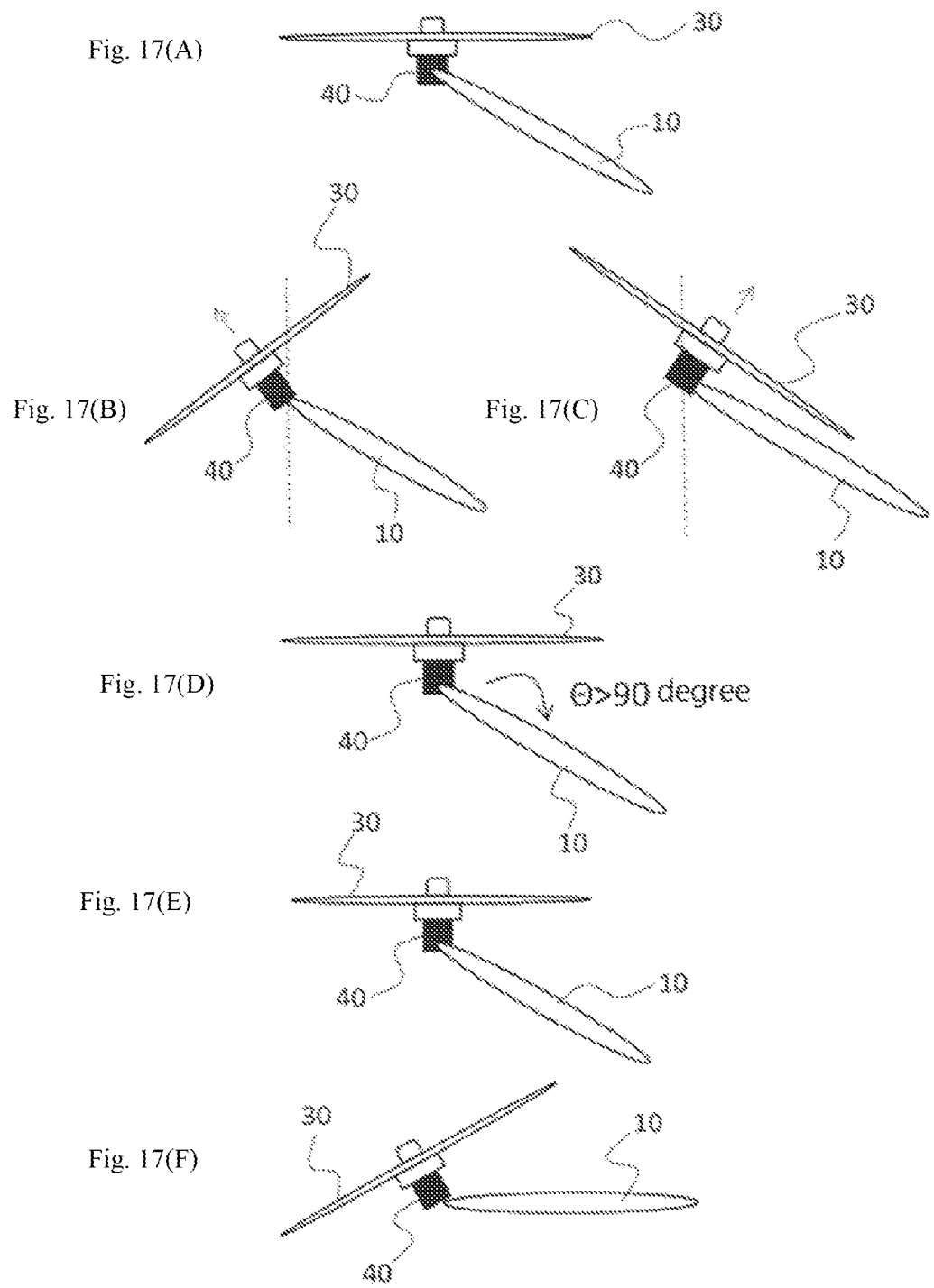

AIRCRAFT WITH PIVOTALLY CONNECTED WING AND ROTOR

TECHNICAL FIELD

The present invention relates to an aircraft, and more particularly to an aircraft in which a thrust part and a wing part are connected to be displaceable.

BACKGROUND ART

As an aircraft equipped with a rotor (rotary wing) and a main wing, two types, a so-called in tilt rotor type and a tilt wing type, are known.

Patent Literature 1 discloses an aircraft in which a main wing is fixed to a body part and the entire rotor including a motor is configured to be displaceable in the range of a vertical direction and a flying direction (tilt rotor type).

Meanwhile, Patent Literature 2 discloses an aircraft in which the main wing and the body part are configured to be displaceable in the range of a vertical direction and a flying direction, and the entire motor and rotor are fixed to the main wing (tilt wing type).

PRIOR ARTS

Patent Literature

[Patent Literature 1] Japanese Unexamined Patent Application Publication No. 2013-501677
[Patent Literature 2] Japanese Unexamined Patent Application Publication No. 2017-81360

SUMMARY OF THE INVENTION

Technical Problem

According to the technique of Patent Literature 1, since the main wing enters a wide range of the propeller wake at the time of ascending, the flight efficiency of the main wing is deteriorated. Further, at the time of transition from hovering to level-flight, the main wing has a negative angle of attack (zero lift angle). That is, there is a risk that the airframe will descend until the horizontal direction thrust required for lift generation by the main wing is obtained.

According to the technique of Patent Literature 2, since the entire main wing is displaced, it is unstable when receiving resistance of wind.

The present invention has been made in view of the above circumstances, and provides an aircraft that enables an efficient and safe transition from hovering to level-flight.

Technical Solution

According to the present invention, there is provided an aircraft including:
a lift generating part,
a thrust generating part capable of flying and hovering,
a connecting part that displaceable connects the lift generating part and the thrust generating part so that the lift generating part can maintain a positive angle of attack with respect to the flying direction at least at the time of ascending.

According to the present invention, there is provided an aircraft including:
a lift generating part,
a thrust generating part capable of flying and hovering,
a connecting part that displaceably connects the lift generating part and the thrust generating part so that the lift generating part can maintain a positive angle of attack with respect to the flying direction at least at the time of ascending.

According to the present invention, there is provided an aircraft including:
a lift generating part,
a thrust generating part capable of flying and hovering,
a connecting part that displaceably connects the lift generating part and the thrust generating part so that the lift generating part can maintain a positive angle of attack with respect to the flying direction at least at the time of ascending vertically.

According to the present invention, there is provided an aircraft including:
a lift generating part,
a thrust generating part capable of flying and hovering,
a connecting part that displaceably connects the lift generating part and the thrust generating part so that the lift generating part can maintain a positive angle of attack with respect to the flying direction at least at the time of descending.

According to the present invention, there is provided an aircraft including:
a lift generating part,
a thrust generating part capable of flying and hovering,
a connecting part that displaceably connects the lift generating part and the thrust generating part so that the lift generating part can maintain a positive angle of attack with respect to the flying direction at least at the time of descending vertically.

Advantageous Effects

According to the present invention, an aircraft that enables an efficient and safe transition from hovering to level-flight can be provided.

BRIEF DESCRIPTION OF THE DRAWINGS

FIG. 1 is a view of an aircraft according to a first embodiment of the present invention. The illustrated aircraft is in a state at the time of landed state.

FIG. 2 is a view illustrating an aircraft according to the first embodiment of the present invention. The illustrated aircraft is in a state at the time of ascending.

FIG. 3 is a view illustrating an aircraft according to the first embodiment of the present invention. The illustrated aircraft is in a flight state in the traveling direction.

FIGS. 8(A)-8(C) are views showing the flying directions of the aircraft of FIG. 1.

FIGS. 10(A)-10(F) are views specifying the state of the aircraft at the time of ascending (part 1).

FIGS. 12(A)-12(F) are views specifying the state of the aircraft at the time of ascending (part 3).

FIGS. 14(A)-14(F) are views specifying the state of the aircraft at the time of descending (part 1).

FIGS. 15(A)-15(F) are views specifying the state of the aircraft at the time of descending (part 2).

FIGS. 16(A)-16(F) are views specifying the state of the aircraft at the time of descending (part 3).

FIGS. 17(A)-17(F) are views specifying the state of the aircraft at the time of descending (part 4).

DETAILED DESCRIPTION OF THE EMBODIMENTS

Figure 4A:
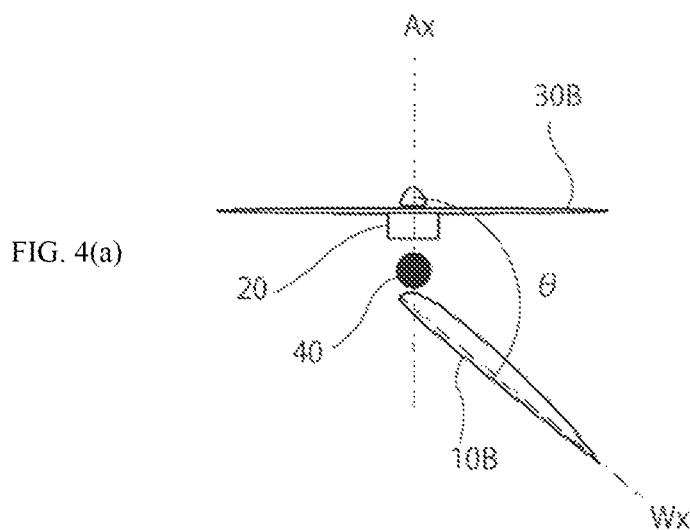
FIGS. 4(*a*)-4(*c*) are partially enlarged views showing the vicinity of the lower main wing of the aircraft of FIG. 1.

The aircraft according to an embodiment of the present invention has the following configuration.

[Item 1]
An aircraft including:
a lift generating part,
a thrust generating part capable of flying and hovering,
a connecting part that displaceably connects the lift generating part and the thrust generating part so that the lift generating part can maintain a positive angle of attack with respect to the flying direction at least at the time of hovering.

[Item 2]
The aircraft as set forth in Item 1,
wherein the lift generating part is a wing part,
the thrust generating part is a rotary wing,
a central axis of rotation of the rotary wing and a chord line of the wing part form a predetermined angle, and
the connecting part connects the lift generating part and the thrust generating part so that the predetermined angle can maintain a predetermined range of at least 105 degrees or more and less than 180 degrees at least during take-off and landing and during hovering.

[Item 3]
The aircraft as set forth in Item 2,
wherein the connecting part connects the lift generating part and the thrust generating part so that the predetermined angle can maintain a predetermined range of 105 degrees or more and 150 degrees or less at least during take-off and landing and during hovering.

[Item 4]
The aircraft as set forth in any one of Items 1 to 3,
wherein the connecting part connects the lift generating part and the thrust generating part so that the predetermined angle is approximately 180 degrees during flight.

1. Specifying the State at the Time of Hovering

[Item 5]
A aircraft including:
a lift generating part,
a thrust generating part capable of flying and hovering,
a connecting part that displaceably connects the lift generating part and the thrust generating part so that the lift generating part can maintain a positive angle of attack with respect in to the flying direction at least at the time of ascending.

[Item 6]
The aircraft as set forth in Item 5,
wherein the lift generating part is a wing part having a main surface, and
at least at the time of hovering, the propulsion direction by the thrust generating part is along a direction obliquely intersecting the vertical direction.

[Item 7]
The aircraft as set forth in Item 6,
wherein at least at the time of hovering, the propulsion direction and the main surface form an obtuse angle.

[Item 8]
The aircraft as set forth in Item 7,
wherein at least at the time of hovering, the propulsion direction is along the vertical direction.

2. Specifying the State at the Time of Ascending (When Ascending Forward)

[Item 9]
An aircraft including:
a lift generating part,
a thrust generating part capable of flying and hovering,
a connecting part that displaceably connects the lift generating part and the thrust generating part so that the lift generating part can maintain a positive angle of attack with respect to the flying direction at least at the time of ascending.

[Item 10]
The aircraft as set forth in Item 9,
wherein the lift generating part is a wing part having a main surface, and
at least at the time of ascending forward, the propulsion direction by the thrust generating part is along a direction obliquely intersecting the vertical direction.

[Item 11]
The aircraft as set forth in Item 10,
wherein at least at the time of ascending forward, the propulsion direction and the main surface form an obtuse angle.

[Item 12]
The aircraft as set forth in Item 11,
wherein at least at the time of ascending forward, the propulsion direction is along the vertical direction.

[Item 13]
The aircraft as set forth in Item 11,
wherein at least at the time of ascending forward, the propulsion direction is directed obliquely forward.

[Item 14]
The aircraft as set forth in any one of Items 9 to 13,
which includes at least a plurality of propellers, and ascends forward by adjusting the output.

3. Specifying the State at the Time of Ascending (When Ascending Backward)

[Item 15]
The aircraft as set forth in Item 5,
wherein the lift generating part is a wing part having a main surface, and
at least at the time of ascending backward, a propulsion direction by the thrust generating part is along a direction obliquely intersecting the vertical direction.

[Item 16]
The aircraft as set forth in Item 15,
wherein at least at the time of ascending backward, the propulsion direction and the main surface form an obtuse angle.

[Item 17]
The aircraft as set forth in Item 16,
wherein at least at the time of ascending backward, the propulsion direction is along the vertical direction.

[Item 18]
The aircraft as set forth in Item 16,
wherein at least at the time of ascending backward, the propulsion direction is directed obliquely backward.

[Item 19]
The aircraft as set forth in any one of Items 15 to 18,
which includes at least a plurality of propellers, and ascends backward by adjusting the output.

4. Specifying the State at the Time Of Ascending (When Ascending to the Left or Right Sides)

[Item 20]
The aircraft as set forth in Item 5,
wherein the lift generating part is a wing part having a main surface, and
at least at the time of ascending sideward, a propulsion direction by the thrust generating part is along a direction obliquely intersecting the vertical direction.

[Item 21]
The aircraft as set forth in Item 20,
wherein at least at the time of ascending sideward, the propulsion direction and the main surface form an obtuse angle.

[Item 22]
The aircraft as set forth in Item 21,
wherein at least at the time of ascending sideward, the propulsion direction is along the vertical direction.

[Item 23]
The aircraft as set forth in Item 21,
wherein at least at the time of ascending sideward, the propulsion direction is directed obliquely backward.

[Item 24]
The aircraft as set forth in any one of Items 20 to 23,
which includes at least a plurality of propellers, and ascends sideward by adjusting the output.

5. Specifying the State at the Time of Ascending (When Ascending Vertically)

[Item 25]
An aircraft including:
a lift generating part,
a thrust generating part capable of flying and hovering,
a connecting part that displaceably connects the lift generating part and the thrust generating part so that the lift generating part can maintain a positive angle of attack with respect to the flying direction at least at the time of ascending vertically.

[Item 26]
The aircraft as set forth in Item 25,
wherein the lift generating part is a wing part having a main surface, and
at least at the time of ascending vertically, a propulsion direction by the thrust generating part is along a direction obliquely intersecting the vertical direction.

[Item 27]
The aircraft as set forth in Item 26,
wherein at least at the time of ascending vertically, the propulsion direction and the main surface form an obtuse angle.

[Item 28]
The aircraft as set forth in Item 27,
wherein at least at the time of ascending vertically, the propulsion direction is along the vertical direction.

[Item 29]
The aircraft as set forth in Item 27,
wherein at least at the time of ascending vertically, the propulsion direction is directed obliquely backward.

[Item 30]
The aircraft as set forth in any one of Items 25 to 29,
which includes at least a plurality of propellers, and ascends vertically by adjusting the output.

6. Specifying the State at the Time Of Descending (When Descending Forward)

[Item 31]
An aircraft including:
a lift generating part,
a thrust generating part capable of flying and hovering,
a connecting part that displaceably connects the lift generating part and the thrust generating part so that the lift generating part can maintain a positive angle of attack with respect to the flying direction at least at the time of descending vertically.

[Item 32]
The aircraft as set forth in Item 31,
wherein the lift generating part is a wing part having a main surface, and
at least at the time of descending forward, a propulsion direction by the thrust generating part is along a direction obliquely intersecting the vertical direction.

[Item 33]
The aircraft as set forth in Item 32,
wherein at least at the time of descending forward, the propulsion direction and the main surface form an obtuse angle.

[Item 34]
The aircraft as set forth in Item 33,
wherein at least at the time of descending forward, the propulsion direction is along the vertical direction.

[Item 35]
The aircraft as set forth in Item 34,
wherein at least at the time of descending forward, the propulsion direction is directed obliquely forward.

[Item 36]
The aircraft as set forth in any one of Items 31 to 35,
which includes at least a plurality of propellers, and descends forward by adjusting the output.

7. Specifying the State at the Time of Descending (When Descending Backward)

[Item 37]
The aircraft as set forth in Item 31,
wherein the lift generating part is a wing part having a main surface, and
at least at the time of descending backward, a propulsion direction by the thrust generating part is along a direction obliquely intersecting the vertical direction.

[Item 38]
The aircraft as set forth in Item 37,
wherein at least at the time of descending backward, the propulsion direction and the main surface form an obtuse angle.

[Item 39]
The aircraft as set forth in Item 38,
wherein at least at the time of descending backward, the propulsion direction is along the vertical direction.

[Item 40]
The aircraft as set forth in Item 39,
wherein at least at the time of descending backward, the propulsion direction is directed obliquely backward.

[Item 41]
The aircraft as set forth in any one of Items 37 to 40, which includes at least a plurality of propellers, and descends backward by adjusting the output.

8. Specifying the State at the Time Of Descending (When Descending to the Left Or Right Sides)

[Item 42]
The aircraft as set forth in Item 31,
wherein the lift generating part is a wing part having a main surface, and
at least at the time of descending sideward, a propulsion direction by the thrust generating part is along a direction obliquely intersecting the vertical direction.

[Item 43]
The aircraft as set forth in Item 42,
wherein at least at the time of descending sideward, the propulsion direction and the main surface form an obtuse angle.

[Item 44]
The aircraft as set forth in Item 43,
wherein at least at the time of descending sideward, the propulsion direction is along the vertical direction.

[Item 45]
The aircraft as set forth in Item 43,
wherein at least at the time of descending sideward, the propulsion direction is directed obliquely backward.

[Item 46]
The aircraft as set forth in any one of Items 42 to 45, which includes at least a plurality of propellers, and descends sideward by adjusting the output.

9. Specifying the State at the Time of Descending (When Descending Vertically)

[Item 47]
An aircraft including:
a lift generating part,
a thrust generating part capable of flying and hovering,
a connecting part that displaceably connects the lift generating part and the thrust generating part so that the lift generating part can maintain a positive angle of attack with respect to the flying direction at least at the time of descending vertically.

[Item 48]
The aircraft as set forth in Item 47,
wherein the lift generating part is a wing part having a main surface, and
at least at the time of descending vertically, a propulsion direction by the thrust generating part is along a direction obliquely intersecting the vertical direction.

[Item 49]
The aircraft as set forth in Item 48,
wherein at least at the time of descending vertically, the propulsion direction and the main surface form an obtuse angle.

[Item 50]
The aircraft as set forth in Item 49,
wherein at least at the time of descending vertically, the propulsion direction is along the vertical direction.

[Item 51]
The aircraft as set forth in Item 49,
wherein at least at the time of descending vertically, the propulsion direction is directed obliquely backward.

[Item 52]
The aircraft as set forth in any one of Items 47 to 51, which includes at least a plurality of propellers, and descends vertically by adjusting the output.

Next, the aircraft according to an embodiment of the present invention will be described with reference to the accompanying figures.

Structure

As shown in FIG. 1, the aircraft 1 according to the present embodiment includes an upper main wing 10T and a lower main wing 10B. (Hereinafter, the upper main wing 10T and the lower main wing 10B may be collectively referred to as "main wing 10"). The upper main wing 10T and the lower main wing 10B are connected by a connecting part 50. The connecting part 50 is displaceably connected to each other via a body part 60 extending in the front-rear direction and a connecting part 55. A vertical tail 70 is provided at the rear end of the body part 60.

The main wing 10 has the same function as the so-called main wing of an aircraft, and ascends the aircraft 1 by the lift generated on the upper surface of the main wing when traveling in the traveling direction D. In the initial state (landed state) shown in FIG. 1, the main wing 10 is provided in a direction that maximizes the lift generated when traveling so as to have a positive angle of attack with respect to the traveling direction D.

A motor 20T is displaceably connected to the rear end (rear edge) of the upper main wing 10T via a connecting part 40. A propeller 30T is attached to the motor 20T, and the propeller 30T rotates and obtain thrust by the rotation of the motor 20T. The motor 20T of the upper main wing 10T according to the present embodiment employs a so-called propulsion type (push type) propulsion method. That is, the pitch of the propeller 30T is adjusted so as to send wind from top to bottom when the motor 20T is rotated in the illustrated state.

Meanwhile, the motor 20B is displaceably connected to the lower main wing 10B, specifically, to the rear end (rear edge) of the lower main wing 10B, via the connecting part 40. A propeller 30B is attached to the motor 20B, and the propeller 30B rotates and obtain thrust due to the rotation of the motor 20B. The motor 20B of the lower main wing 10B according to the present embodiment employs a so-called traction type (pull type) propulsion method. That is, the pitch of the propeller 30B is adjusted so as to send wind from top to bottom when the motor 20B is rotated in the illustrated state.

In the above-described embodiment, the main wing 10 includes two of an upper main wing 10T and a lower main wing 10B, but may include any one of them. Further, both the motors 20T and 20B may be a propulsion type (push type), a traction type (pull type), or a combination thereof.

As described above, the aircraft according to the present embodiment includes a connecting part 40 for connecting the main wing 10 and the motor 20 (propellers 30B and 30T) so as to be displaceable with each other. The angles of the main wing 10 and the motor 20 maintains appropriate angles according to the situation (the function of the connecting part 40 will be described later).

Flight Form

Hereinafter, at the time of take-off, flight and landing of the aircraft according to the present embodiment, the form of the aircraft will be described with reference to FIGS. 1 to 3.

As shown in FIG. 1, when trying to ascend from a state at the time of landed state (initial state), the propeller 30B is disposed upward (=the direction in which propulsive force is generated in an upper direction), and the propeller 30T is disposed downward (=the direction in which propulsive force is generated in an upper direction).

Further, both main wings 10 have a positive angle of attack with respect to the traveling direction (that is, the angle formed by the chord line and the traveling direction is positive, and the front-rise direction). When ascending, the motors 20t and 20B are rotated in the illustrated state.

As shown in FIG. 2, when the aircraft is ascending and hovering, the vertical ascent is performed as it is in the state shown in FIG. 1. At this time, the connecting part 40 functions so that all the main wings 10T and 10B also form a positive angle of attack with respect to the traveling direction D.

At this time, a wake due to the propeller 30B will be generated, but the angle is made such that the lower main wing 10B has an angle of attack (an angle at which the wake can be easily released). That is, at the portion where the propeller 30B and the lower main wing 10B do not overlap when viewed from above (the portion at a left side with respect to the axis Ax in FIG. 4(a)), the wake flows downward as it is, while at the portion where the propeller 30B and the lower main wing 10B overlap (the portion on a right side with respect to the axis Ax in FIG. 4A), the wake will flow downward along the upper surface of the lower main wing 30T.

Figure 6A:
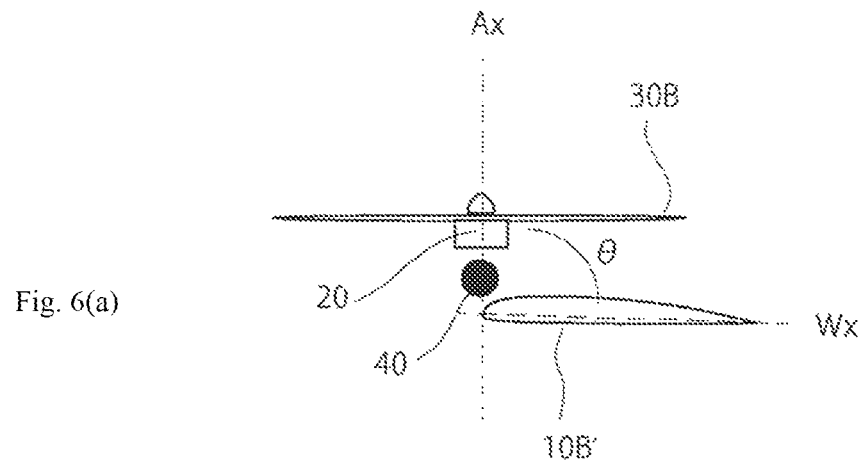
FIGS. 6(*a*)-6(*c*) are partially enlarged views showing the vicinity of the lower main wing of a conventional aircraft.
Figure 6B:
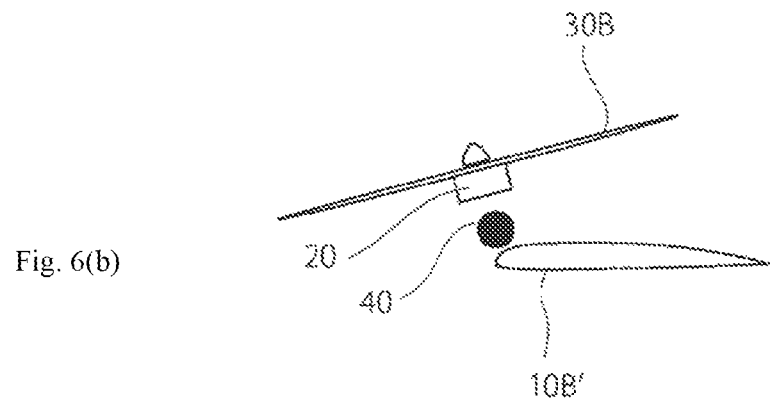
Figure 6C:
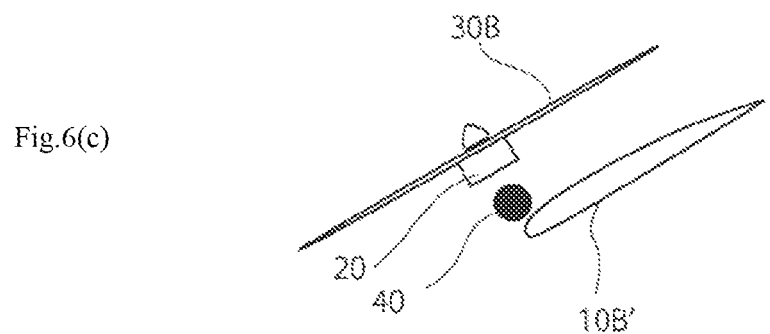
Figure 7A:
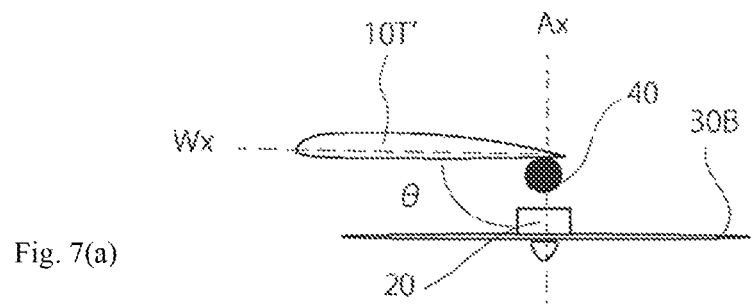
FIGS. 7(*a*)-7(*c*) are partially enlarged view views showing the vicinity of the upper main wing of a conventional aircraft.
Figure 7B:
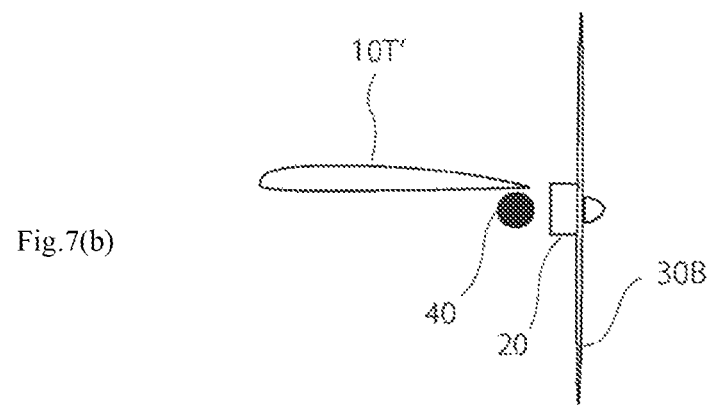
Figure 7C:
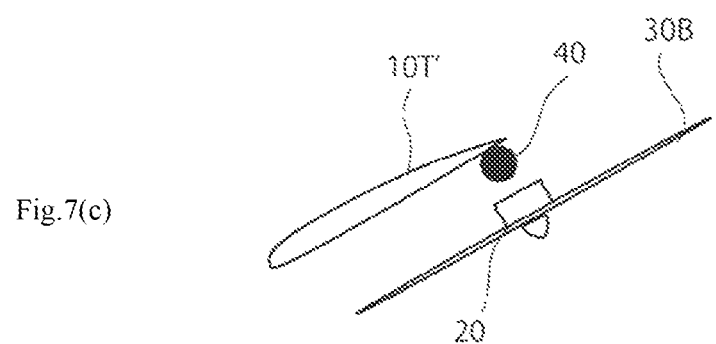

By the way, in the case of a conventional tilt rotor type aircraft, the ascent is started in the initial state shown in FIGS. 6 (a) and 7 (a). As shown in FIGS. 6 (c) and 7 (c), for hovering, it is necessary to slowly displace the motor 20, while maintaining the angle of attack of the main wing 10B' and the main wing 10T' at 0 degrees, so that the main wing 10B' and the main wing 10T' do not form a negative angle of attack (zero lift angle). If the motor 20 is quickly displaced, for example, as shown in FIGS. 6(c) and 7(c), it becomes a negative angle of attack that displaces up to the main wing 10B' and the main wing 10T', which causes the aircraft to temporarily descend and also could cause a crash.

Figure 4B:
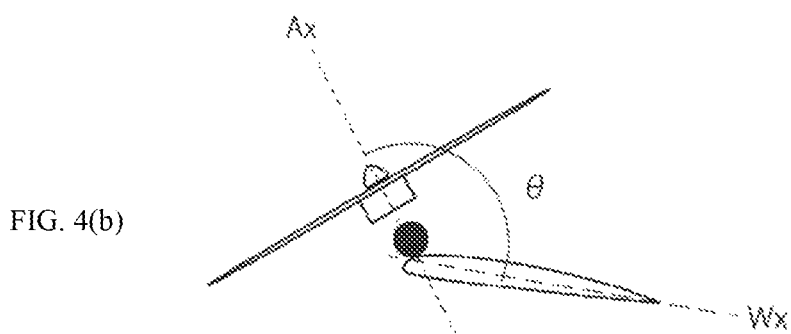

According to the embodiment of the present invention, as shown in FIG. 4(b), it has a positive angle of attack in hovering, and thus, even when the motor 20 starts to be displaced and the aircraft moves in the traveling direction, the angle of attack can maintain a sufficient angle to obtain lift, so that transition can be made to level-flight without changing altitude safely.

As shown in FIG. 3, when the transition from hovering to level-flight is completed, the propeller 30B is directed forward and the propeller 30T is directed backward. By directing the propellers 30B and 30T at a horizontal direction, it becomes possible to obtain a propulsive force for moving forward.

When the aircraft arrives at over the destination, etc., it is displaced to the same posture as in FIG. 2 in order to hover again. Then, it descends and lands in that state.

Details of Displacement

Next, the displacement from (an ascending state and) a hovering state to a level-flight state will be described in detail with reference to FIGS. 4 to 7.

FIG. 4(a) shows the closed-up vicinity of the lower main wing 10B in the hovering state. As shown, the rotation center axis Ax of the propeller 30B and the chord line Wx of the main wing 10B form a predetermined angle θ. At the time of hovering, the predetermined angle θ may be a predetermined range of 105 degrees or more and less than 180 degrees, but in particular, in order to reduce influence of the propeller wake, it is desirable that the predetermined angle is in a predetermined range of 105 degrees or more and 150 degrees or less.

As shown in FIG. 4B, at the time of transition from a hovering state to a level-flight state, the connecting part 40 is displaced and the motor 20 is tilted forward, and at the same time, the main wing 10B is displaced to be parallel to the horizontal direction.

Figure 4C:
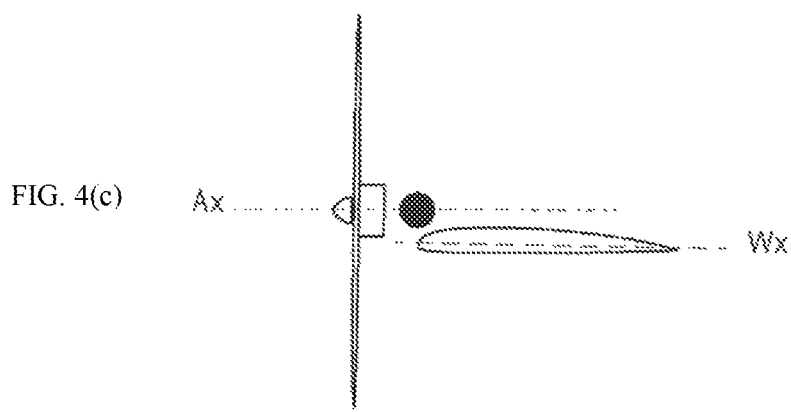

As shown in FIG. 4(c), when the transition to the level-flight state is completed, the central axis of the propeller 30B becomes parallel to the horizontal direction.

Figure 5A:
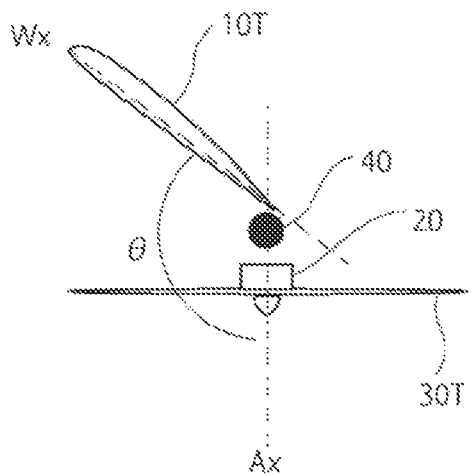
FIGS. 5(*a*)-5(*c*) are partially enlarged views showing the vicinity of the upper main wing of the aircraft of FIG. 1.

Further, similarly, FIG. 5(a) shows the closed-up vicinity of the upper main wing 10T in the hovering state. As shown, the rotation center axis Ax of the propeller 30B and the chord line Wx of the main wing 10B form a predetermined angle θ. At the time of hovering, the predetermined angle θ may be a predetermined range of 105 degrees or more and less than 180 degrees, but in particular, in order to reduce influence of the propeller wake, it is desirable that the predetermined angle is in a predetermined range of 105 degrees or more and 150 degrees or less.

Figure 5B:
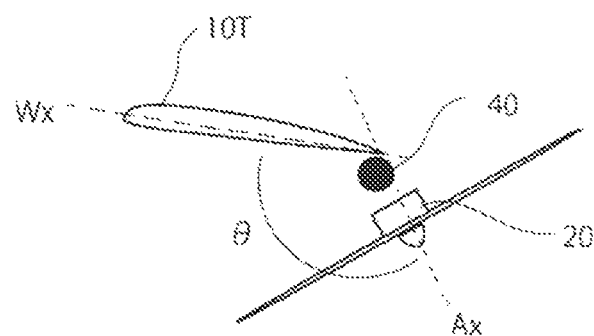

As shown in FIG. 5(b), at the time of transition from a hovering state to a level-flight state, the connecting part 40 is displaced and the motor 20 is tilted forward, and at the same time, the upper main wing 10T is displaced to be parallel to the horizontal direction.

Figure 5C:
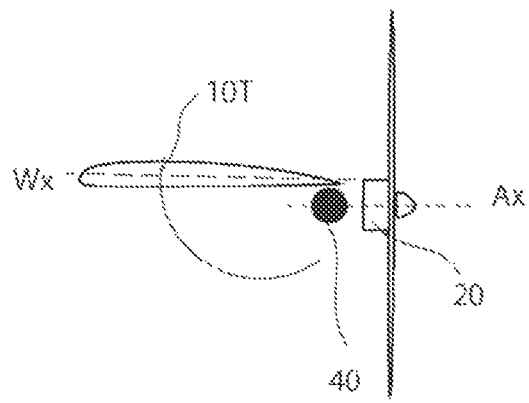

As shown in FIG. 5(c), when the transition to the level-flight state is completed, the central axis of the propeller 30T becomes parallel to the horizontal direction (that is, the angle between the central axis Ax and the chord line is 180 degrees)

FIG. 8 is a view showing the flying direction of the aircraft of FIG. 1. Hereinafter, the same elements are given with the same reference numerals for the description of FIGS. 9 to 17, and overlapped descriptions are omitted. Further, note that dimensional ratios in the drawings are exaggerated for convenience of explanation, and they may be different from the actual ratios in some cases. Moreover, in the drawings, the vertical direction is the Z-direction, the traveling direction of the aircraft is the X-direction, and the direction orthogonal to these axes is the Y-direction.

1. In the State at the Time of Hovering

Figure 9A:
FIGS. 9(A)-9(E) are views specifying the state of the aircraft at the time of hovering.

As shown in FIG. 9(A), the aircraft includes a wing part 10 (lift generating part), a propeller 30 capable of flying and hovering (thrust generating part), a connecting portion 40 that displaceably connects the wing part 10 and the propeller 30 so that the wing part 10 can maintain a positive angle of attack with respect to the flying direction at least at the time of ascending.

Figure 9B:
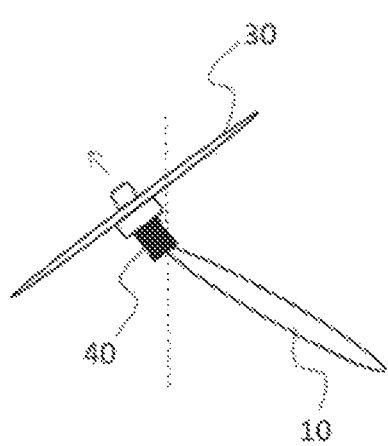
Figure 9C:
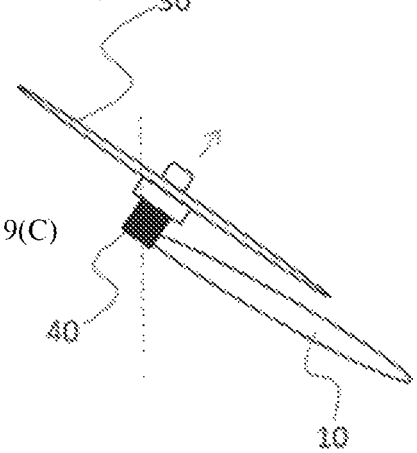

As shown in FIGS. 9(B) and 9(C), the wing part 10 (lift generating part) is a wing part having a main surface, and at least at the time of hovering, a propulsion direction by the propeller 30 may be along a direction obliquely intersecting the vertical direction.

Figure 9D:
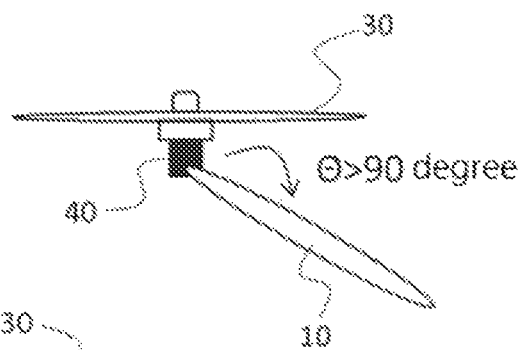

As shown in FIG. 9(D), at least at the time of hovering, the propulsion direction and the main surface may form an obtuse angle. The obtuse angle θ may be a predetermined range of 105 degrees or more and less than 180 degrees, but in particular, in order to reduce influence of the propeller wake, it is desirable that the predetermined angle is in a predetermined range of 105 degrees or more and 150 degrees or less.

Figure 9E:
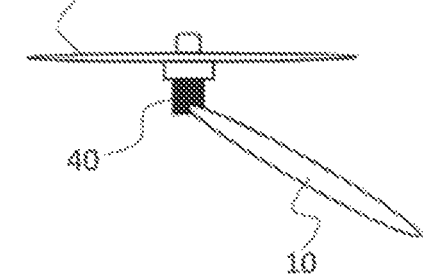

As shown in FIG. 9(E), at least at the time of hovering, the propulsion direction may be along the vertical direction.

2. In the State at the Time of Ascending (When Ascending Forward)

As shown in FIG. 10 (A), the aircraft includes a wing part 10 (lift generating part), propeller 30 capable of flying and hovering (thrust generating part), a connecting part 40 that displaceably connects the wing part 10 and the propeller 30 so that the wing part 10 can maintain a positive angle of attack with respect to the flying direction at least at the time of ascending forward.

As shown in FIGS. 10(B) and 10(C), the wing part 10 (lift generating part) is a wing part having a main surface, and at least at the time of ascending forward, a propulsion direction by the thrust generating part may be along a direction obliquely intersecting the vertical direction.

As shown in FIG. 10(D), at least at the time of ascending forward, the propulsion direction and the main surface may form an obtuse angle θ. The obtuse angle θ may be a predetermined range of 105 degrees or more and less than 180 degrees, but in particular, in order to reduce influence of the propeller wake, it is desirable that the predetermined angle is in a predetermined range of 105 degrees or more and 150 degrees or less.

As shown in FIG. 10(E), at least at the time of ascending forward, the propulsion direction may be along the vertical direction.

As shown in FIG. 10(F), at least at the time of ascending forward, the propulsion direction may be directed obliquely forward.

The aircraft includes at least a plurality of propellers, and may ascend forward by adjusting the output.

3. In the State at the Time of Ascending (When Ascending Backward)

As shown in FIG. 11 (A), the aircraft includes a wing part 10 (lift generation part), a propeller 30 capable of flying and hovering (thrust generating part), and a connecting portion 40 that displaceably connects the wing part 10 and the propeller 30 so that the wing part 10 can maintain a positive angle of attack with respect to the flying direction at least at the time of ascending backward.

Figure 11A:
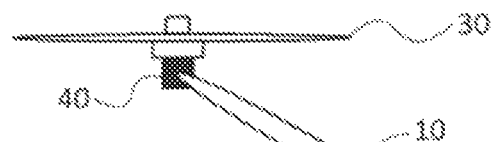
FIGS. 11(A)-11(F) are views specifying the state of the aircraft at the time of ascending (part 2).
Figure 11B:
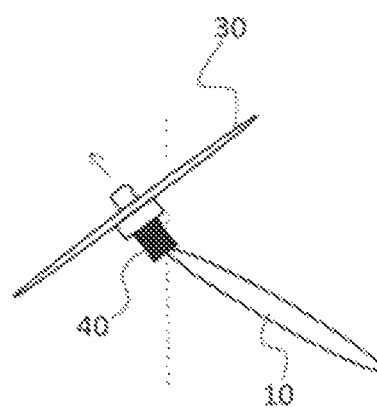
Figure 11C:
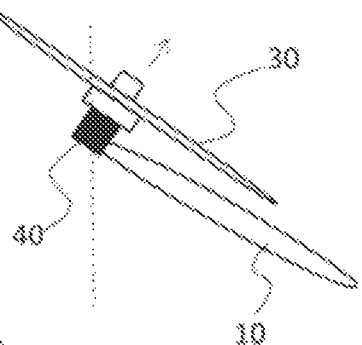

As shown in FIGS. 11(B) and 11(C), the wing part 10 (lift generating part) is a wing part having a main surface, and at least at the time of ascending backward, a propulsion direction by the propeller 30 (thrust generating part) may be along a direction obliquely intersecting the vertical direction.

Figure 11D:
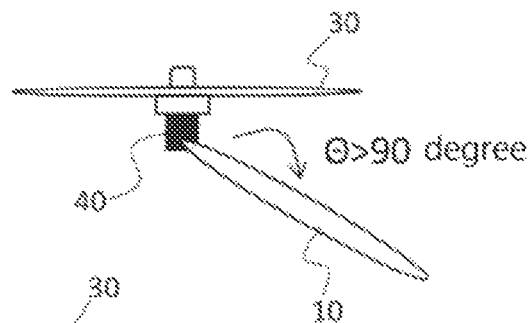

As shown in FIG. 11(D), at least at the time of ascending backward, the propulsion direction and the main surface may form an obtuse angle θ. The obtuse angle θ may be a predetermined range of 105 degrees or more and less than 180 degrees, but in particular, in order to reduce influence of the propeller wake, it is desirable that the predetermined angle is in a predetermined range of 105 degrees or more and 150 degrees or less.

Figure 11E:
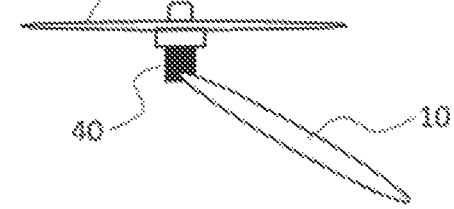

As shown in FIG. 11(E), at least at the time of ascending backward, the propulsion direction may be along the vertical direction.

Figure 11F:
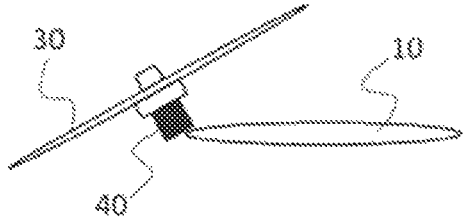

As shown in FIG. 11(F), at least at the time of ascending backward, the propulsion direction to may be directed obliquely backward.

The aircraft includes at least a plurality of propellers, and may ascend backward by adjusting the output.

4. In the State at the Time of Ascending (When Ascending To The Left Or Right Sides)

As shown in FIG. 12 (A), the aircraft includes a wing part 10 (lift generating part), a propeller 30 capable of flying and hovering (thrust generating part), and a connecting part 40 that displaceably connects the wing part 10 and the propeller 30 so that the wing part 10 can maintain a positive angle of attack with respect to the flying direction at least at the time of ascending backward.

As shown in FIGS. 12(A) and 12(B), the wing part 10 (lift generating part) is a wing part having a main surface, and at least at the time of ascending sideward, a propulsion direction by the propeller 30 (thrust generating part) may be along a direction obliquely intersecting the vertical direction.

As shown in FIG. 12(C), at least at the time of ascending sideward, the propulsion direction and the main surface may have an obtuse angle θ. The obtuse angle θ may be a predetermined range of 105 degrees or more and less than 180 degrees, but in particular, in order to reduce influence of the propeller wake, it is desirable that the predetermined angle is in a predetermined range of 105 degrees or more and 150 degrees or less.

As shown in FIG. 12(D), at least at the time of ascending sideward, the propulsion direction may be along the vertical direction.

As shown in FIG. 12(E), at least at the time of ascending sideward, the propulsion direction may be directed obliquely backward.

The aircraft includes at least a plurality of propellers, and may ascend sideward by adjusting the output.

5. In the State at the Time of Ascending (When Ascending Vertically)

Figure 13A:
FIGS. 13(A)-13(F) are views specifying the state of the aircraft at the time of ascending (part 4).

As shown in FIG. 13(A), the aircraft includes a wing part 10 (lift generating part), a propeller 30 capable of flying and hovering (thrust generating part), and a connecting part 40 that displaceably connects the wing part 10 and the propeller 30 so that the wing part 10 can maintain a positive angle of attack with respect to the flying direction at least at the time of ascending vertically.

Figure 13B:
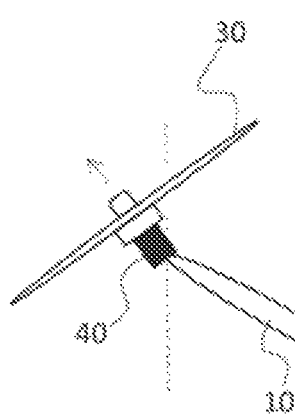
Figure 13C:
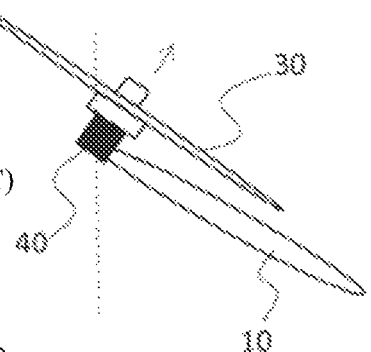

As shown in FIGS. 13(B) and 13(C), the wing part 10 (lift generating part) is a wing part having a main surface, and at least at the time of ascending vertically, a propulsion direction by the propeller 30 (thrust generating part) may be along a direction obliquely intersecting the vertical direction.

Figure 13D:
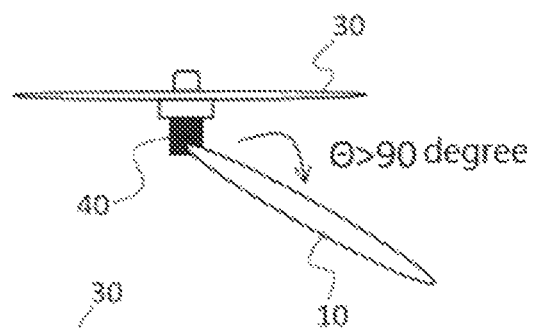

As shown in FIG. 13(D), at least at the time of ascending vertically, the propulsion direction and the main surface may form an obtuse angle θ. The obtuse angle θ may be a predetermined range of 105 degrees or more and less than 180 degrees, but in particular, in order to reduce influence of the propeller wake, it is desirable that the predetermined angle is in a predetermined range of 105 degrees or more and 150 degrees or less.

Figure 13E:
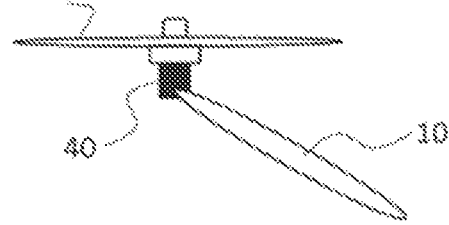

As shown in FIG. 13(E), at least at the time of ascending vertically, the propulsion direction may be along the vertical direction.

Figure 13F:
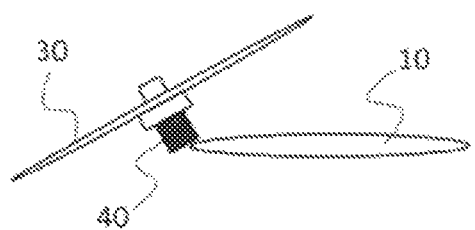

As shown in FIG. 13(F), at least at the time of ascending vertically, the propulsion direction may be directed obliquely backward.

The aircraft includes at least a plurality of propellers, and may ascend vertically by adjusting the output.

6. In the State when Descending (When Descending Forward)

As shown in FIG. 14(A), the aircraft includes a wing part 10 (lift generating part), a propeller 30 capable of flying and hovering (thrust generating part), and a connecting part 40 that displaceably connects the wing part 10 and the propeller 30 so that the wing part 10 can maintain a positive angle of attack with respect to the flying direction at least at the time of descending forward.

As shown in FIGS. 14(B) and 14(C), the wing part 10 (lift generating part) is a wing part having a main surface, and at least at the time of descending forward, a propulsion direction by the propeller 30 (thrust generating part) is along a direction obliquely intersecting the vertical direction.

As shown in FIG. 14(D), at least at the time of descending forward, the propulsion direction and the main surface may form an obtuse angle. The obtuse angle θ may be a predetermined range of 105 degrees or more and less than 180 degrees, but in particular, in order to reduce influence of the propeller wake, it is desirable that the predetermined angle is in a predetermined range of 105 degrees or more and 150 degrees or less.

As shown in FIG. 14(E), at least at the time of descending forward, the propulsion direction may be along the vertical direction.

As shown in FIG. 14(F), at least at the time of descending forward, the propulsion direction may be directed obliquely forward.

The aircraft includes at least a plurality of propellers, and may descend forward by adjusting the output.

7. In the State at the Time of Descending (When Descending Backward)

As shown in FIG. 15(A), the aircraft includes a wing part 10 (lift generating part), a propeller 30 capable of flying and hovering (thrust generating part), and a connecting part 40 that displaceably connects the wing part 10 and the propeller 30 so that the wing part 10 can maintain a positive angle of attack with respect to the flying direction at least at the time of descending backward.

As shown in FIGS. 15(B) and 15(C), the wing part 10 (lift generating portion) is a wing part having a main surface, and at least at the time of descending backward, a propulsion direction by the propeller 30 (thrust generating part) may be along a direction obliquely intersecting the vertical direction.

As shown in FIG. 15(D), at least at the time of descending backward, the propulsion direction and the main surface may form an obtuse angle θ. The obtuse angle θ may be a predetermined range of 105 degrees or more and less than 180 degrees, but in particular, in order to reduce influence of the propeller wake, it is desirable that the predetermined angle is in a predetermined range of 105 degrees or more and 150 degrees or less.

As shown in FIG. 15(E), at least at the time of descending backward, the propulsion direction may be along the vertical direction.

As shown in FIG. 15(F), at least at the time of descending backward, the propulsion direction may be directed obliquely backward.

The aircraft includes at least a plurality of propellers, and may descend backward by adjusting the output.

8. In the State at the Time of Descending (When Descending to the Left or Right Sides)

As shown in FIG. 16(A), the aircraft includes a wing part 10 (lift generating part), a propeller 30 capable of flying and hovering (thrust generating part), and a connecting part 40 that displaceably connects the wing part 10 and the propeller 30 so that the wing part 10 can maintain a positive angle of attack with respect to the flying direction at least at the time of descending sideward.

As shown in FIGS. 16(B) and 16(C), the wing part 10 (lift generating part) is a wing part having a main surface, and at least at the time of descending sideward, a propulsion direction by the propeller 30 (thrust generating part) may be along a direction obliquely intersecting the vertical direction.

As shown in FIG. 16(D), at least at the time of descending sideward, the propulsion direction and the main surface may form an obtuse angle θ. The obtuse angle θ may be a predetermined range of 105 degrees or more and less than 180 degrees, but in particular, in order to reduce influence of the propeller wake, it is desirable that the predetermined angle is in a predetermined range of 105 degrees or more and 150 degrees or less.

As shown in FIG. 16(E), at least at the time of descending sideward, the propulsion direction may be along the vertical direction.

As shown in FIG. 16(F), at least at the time of descending sideward, the propulsion direction may be directed obliquely backward.

The aircraft includes at least a plurality of propellers, and may descends sideward by adjusting the output.

9. In the State at the Time of Descending (When Descending Vertically)

As shown in FIG. 17(A), the aircraft includes a wing part 10 (lift generating part), a propeller 30 capable of flying and hovering (thrust generating part), a connecting part 40 that displaceably connects the wing part 10 and the propeller 30 so that the wing part 10 can maintain a positive angle of attack with respect to the flying direction at least at the time of descending vertically.

As shown in FIGS. 17(B) and 17(C), the wing part 10 (lift generating part) is a wing part having a main surface, and at least at the time of descending vertically, a propulsion direction by the thrust generating part may be along a direction obliquely intersecting the vertical direction.

As shown in FIG. 17(D), at least at the time of descending vertically, the propulsion direction and the main surface may form an obtuse angle θ. The obtuse angle θ may be a predetermined range of 105 degrees or more and less than 180 degrees, but in particular, in order to reduce influence of the propeller wake, it is desirable that the predetermined angle is in a predetermined range of 105 degrees or more and 150 degrees or less.

As shown in FIG. 17(E), at least at the time of descending vertically, the propulsion direction may be along the vertical direction.

As shown in FIG. 17 (F), at least at the time of descending vertically, the propulsion direction may be directed obliquely backward.

The aircraft may include at least a plurality of propellers and descend vertically by adjusting the output.

DESCRIPTION OF REFERENCE NUMERALS

1: aircraft
10: main wing
10B: lower main wing
10T: upper main wing
20: motor
30: propeller
30B: lower propeller
30T: upper propeller
40: connecting part
50: connecting part
60: body part
70: vertical tail

The invention claimed is:

1. An aircraft including:
a lift generating part,
a thrust generating part capable of causing the aircraft to fly and hover,
a connecting part that pivotably connects the lift generating part and the thrust generating part so that the lift generating part can maintain a positive angle of attack with respect to the horizontal direction at least at the time of hovering,
wherein the lift generating part is a wing part, and the thrust generating part is a rotary wing and provided at an end of the wing part via the connecting part to pivot the rotary wing around the wing part.

2. The aircraft as set forth in claim 1,
wherein a central axis of rotation of the rotary wing and a chord line of the wing part form a predetermined angle, and
the connecting part connects the lift generating part and the thrust generating part so that the predetermined angle can maintain a predetermined range of at least 105 degrees or more and less than 180 degrees at least during take-off and landing and during hovering.

3. The aircraft as set forth in claim 2,
wherein the connecting part connects the lift generating part and the thrust generating part so that the predetermined angle can maintain a predetermined range of 105 degrees or more and 150 degrees or less at least during take-off and landing and during hovering.

4. An aircraft including:
a lift generating part,
a thrust generating part capable of causing the aircraft to fly and hover,
a connecting part that pivotably connects the lift generating part and the thrust generating part so that the lift generating part can maintain a positive angle of attack with respect to the flying direction at least at the time of ascending,
wherein the lift generating part is a wing part, and the thrust generating part is a rotary wing and provided at the wing part via the connecting part to pivot the rotary wing around the wing part,
wherein the wing part has a main surface, and
wherein at least at the time of hovering, the propulsion direction by the thrust generating part is along a direction obliquely intersecting the vertical direction.

5. The aircraft as set forth in claim 4,
wherein at least at the time of hovering, the propulsion direction and the main surface form an obtuse angle.

6. An aircraft including:
a lift generating part,
a thrust generating part capable of causing the aircraft to fly and hover,
a connecting part that pivotably connects the lift generating part and the thrust generating part so that the lift generating part can maintain a positive angle of attack with respect to the flying direction at least at the time of descending,
wherein the lift generating part is a wing part, and the thrust generating part is a rotary wing and provided at the wing part via the connecting part to pivot the rotary wing around the wing part,
wherein the wing part has a main surface, and
wherein at least at the time of ascending forward, the propulsion direction by the thrust generating part is along a direction obliquely intersecting the vertical direction.

7. The aircraft as set forth in claim 6,
wherein at least at the time of ascending forward, the propulsion direction and the main surface form an obtuse angle.

8. The aircraft as set forth in claim 6,
which includes at least a plurality of propellers, and ascends forward by adjusting the output.

9. The aircraft as set forth in claim 7,
which includes at least a plurality of propellers, and ascends forward by adjusting the output.

* * * * *